B. A. ALPERIN.
UNIVERSAL JOINT.
APPLICATION FILED SEPT. 11, 1918.
1,317,344.
Patented Sept. 30, 1919.
4 SHEETS—SHEET 1.
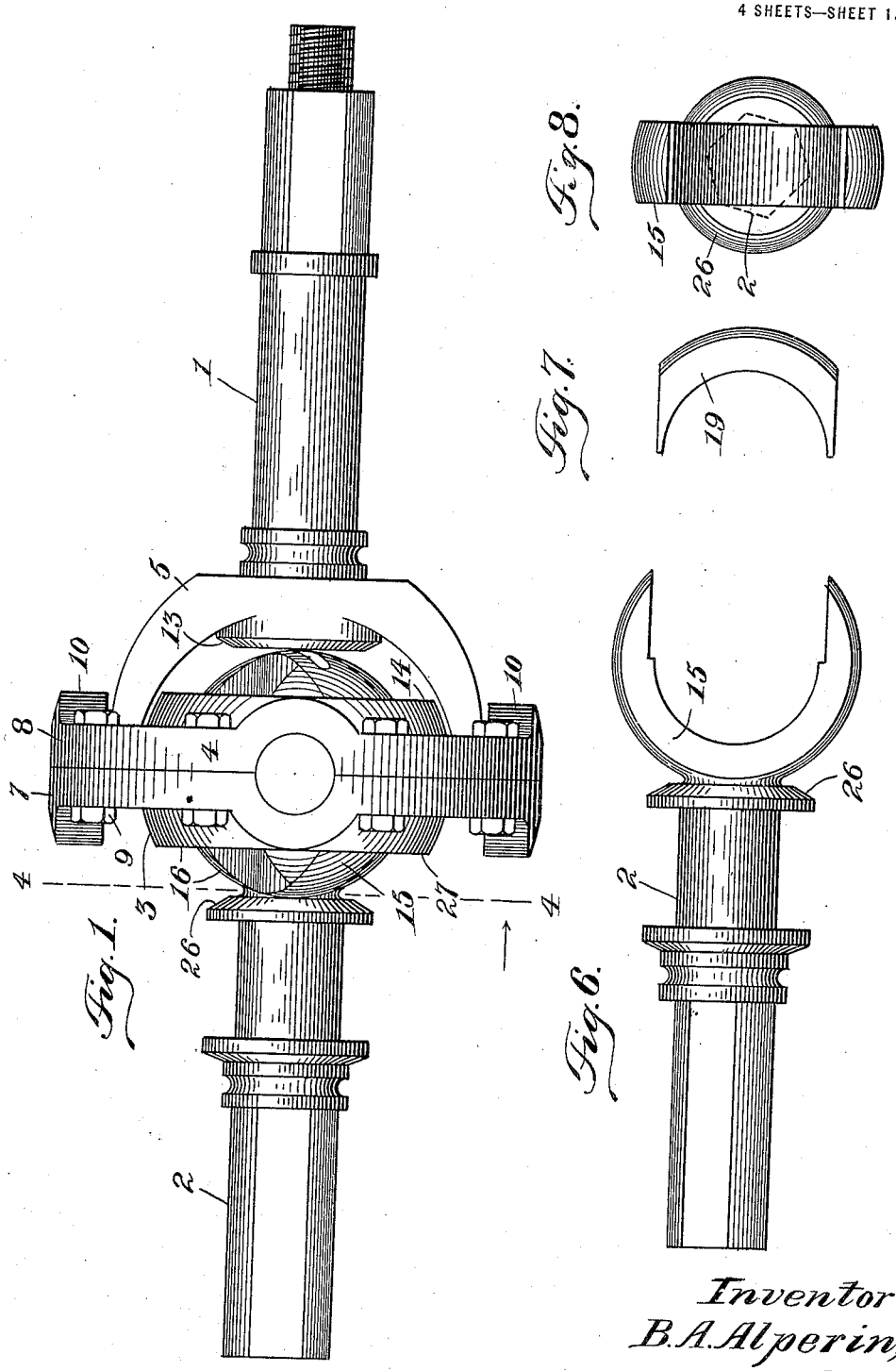
Inventor:
B. A. Alperin,
By his Attorney Wm H. Reid.

B. A. ALPERIN.
UNIVERSAL JOINT.
APPLICATION FILED SEPT. 11, 1918.
1,317,344.
Patented Sept. 30, 1919.
4 SHEETS—SHEET 2.
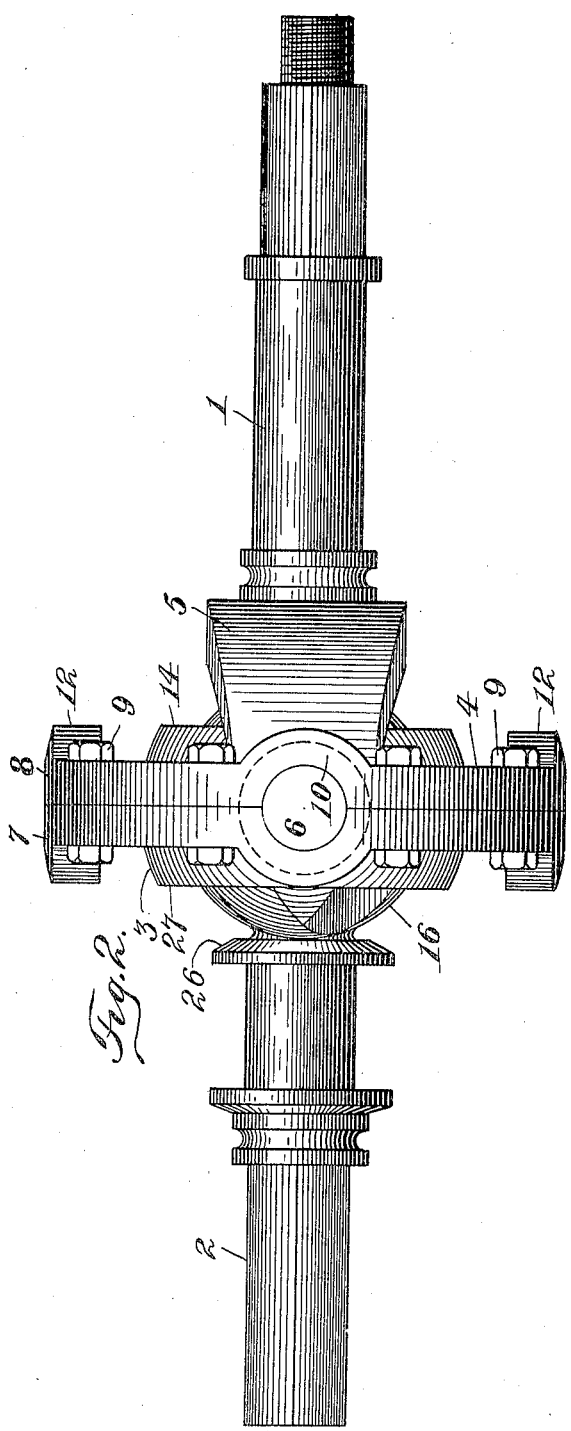
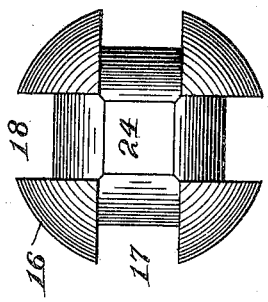
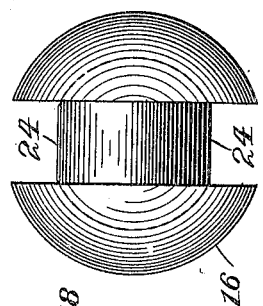
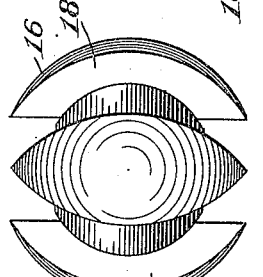
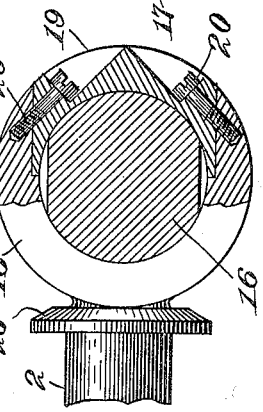
Inventor:
B. A. Alperin,
By his Attorney W. H. Reid.

B. A. ALPERIN.
UNIVERSAL JOINT.
APPLICATION FILED SEPT. 11, 1918.
1,317,344.
Patented Sept. 30, 1919.
4 SHEETS—SHEET 3.
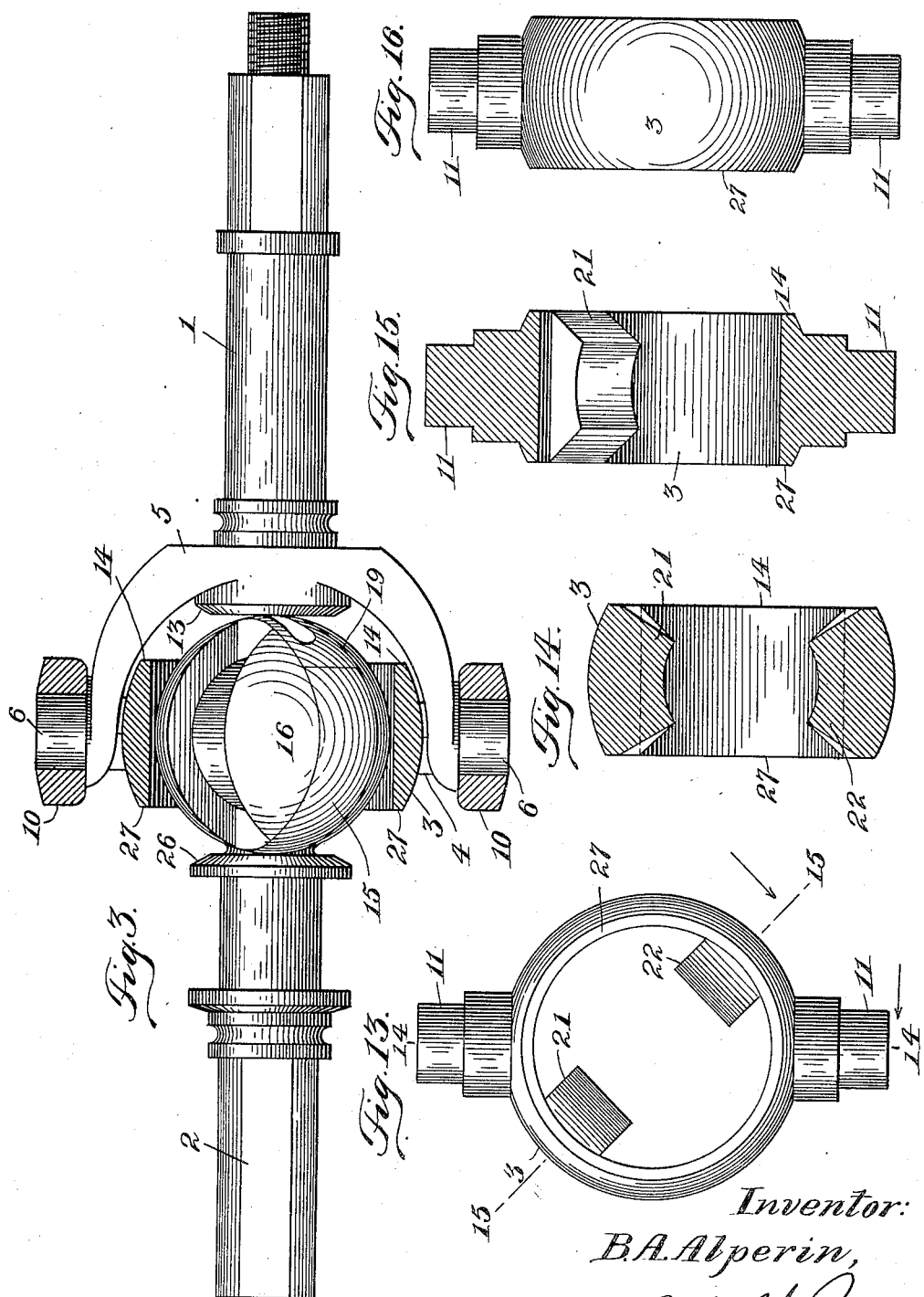
Inventor:
B.A. Alperin,
By his Attorney B. A. ALPERIN.
UNIVERSAL JOINT.
APPLICATION FILED SEPT. 11, 1918.
1,317,344.
Patented Sept. 30, 1919.
4 SHEETS—SHEET 4.
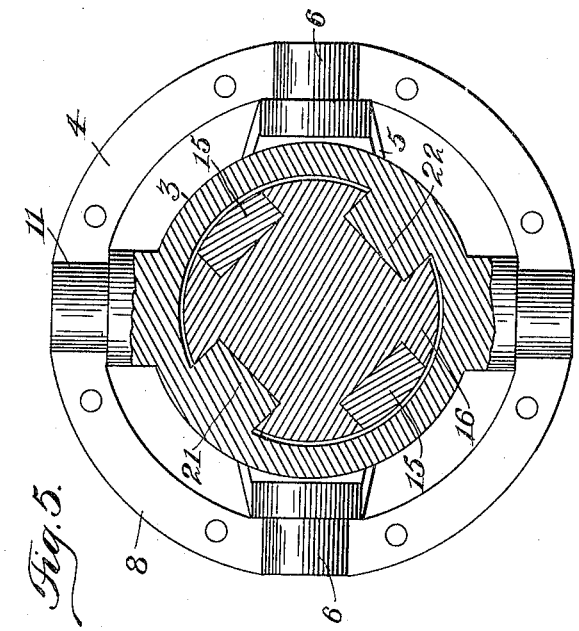
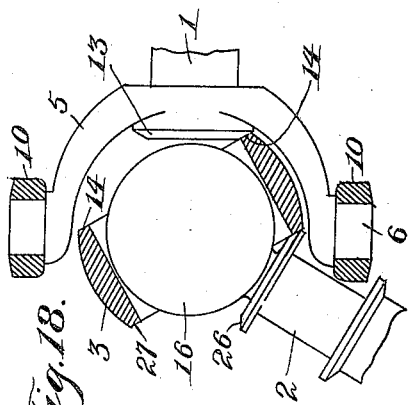
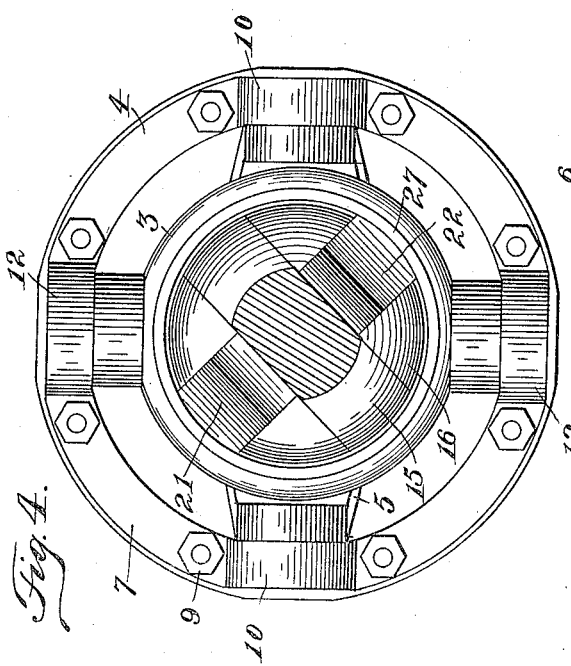
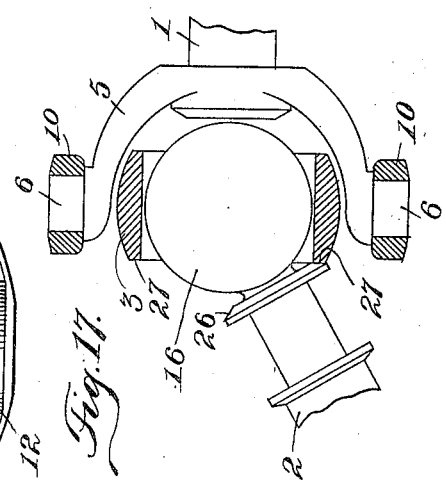
Inventor:
B. A. Alperin,
By his Attorney
Wm. H. Reid.

UNITED STATES PATENT OFFICE.

BERNARD A. ALPERIN, OF PHILADELPHIA, PENNSYLVANIA.

UNIVERSAL JOINT.

1,317,344.  Specification of Letters Patent. Patented Sept. 30, 1919.

Application filed September 11, 1918. Serial No. 253,624.

*To all whom it may concern:*

Be it known that I, BERNARD A. ALPERIN, a citizen of the United States, and a resident of Philadelphia, in the county of Philadelphia and State of Pennsylvania, have invented certain new and useful Improvements in Universal Joints, of which the following is a specification.

My invention relates to universal joints for shafting, etc., and may be used in all places and under all conditions where such universal joints, large or small are desired to be used; but the same is more particularly designed and adapted for use in automobiles on connections at the knuckle joints of combined driving and steering-wheel axles.

In the universal joints hitherto known in the art, the angle which it is possible to make is very limited as a rule, especially where great strength is essential; and when not so limited, great strain is brought upon portions of the mechanism, thus tending to disarrangement, wear, and breakage of the device, when the joint is swung to its limit.

The objects of my invention are to provide a universal joint, which can be swung in any direction, so that the shaft will be at a greater angle than in the joints now known in the art, which will be of great strength and of little friction, of few parts, and of little liability to get out of order, and which may be easily and quickly taken apart and reassembled.

In the accompanying drawings showing one embodiment of my invention: Figure 1 is a plan view. Fig. 2 is a side elevation. Fig. 3 is a view similar to Fig. 1 with the gimbal-rings in section. Fig. 4 is a section on the line 4—4 of Fig. 1. Fig. 5 is a section through the center of the joint, but showing the outer ring in elevation. Fig. 6 shows the inner yoke. Fig. 7 shows the end piece for the yoke. Fig. 8 is an end elevation of the yoke. Fig. 9 shows the yoke and ball in partial section. Figs. 10, 11, and 12 show the float-ball. Fig. 13 shows the inner gimbal-ring in front elevation. Fig. 14 is a section of this ring on the line 15—15 of Fig. 13. Fig. 15 is a section on the line 14—14 of Fig. 13. Fig. 16 is a side elevation of this ring. Figs. 17 and 18 are views showing diagrammatically the joint swung to two different positions.

As shown in the drawings I have set forth a universal joint having an operative connection between two driving elements or shafts 1 and 2, either of which may be the drive shaft and convey power to the other as a driven shaft. These two shafts I connect by a double universal joint, each joint having a universal movement. By this means the intermediate member has a universal joint connection with each driving element and can turn at any angle up to a certain limit with such shaft, whereby one of the driving elements can serve to drive the other element when these elements are turned at an angle that is twice the limit of movement of the intermediate member with each driving element.

As set forth I provide an intermediate member in the form of an inner gimbal-ring 3, and that connects with the driving element 2 by means of an outer gimbal-ring 4, and an outer yoke 5 connected with the shaft 1, and shown integral therewith. This yoke 5 has studs 6, on the outer ends of the arms, see Figs. 2 and 3. The outer gimbal-ring 4 is shown as formed of split portions 7 and 8 secured together by suitable bolts 9. At opposite portions are recesses in the rings that register to form bearings 10 in which the studs 6 are journaled as shown.

The inner gimbal-ring 3 is shown as provided with opposite studs 11, 11 that are journaled in bearing portions 12 in the outer split ring, formed by registering recesses in the ring portions. As shown the axis of swing of the inner ring on the outer ring, is at a right angle to the axis of the outer ring on the yoke 5, see Fig. 5. By this means the inner ring 3 has a universal connection with the shaft 1.

I further provide means for limiting this rotary movement beyond a certain angle, and the yoke 5 is shown as having an annular buffer face or ring 13, that will have a rotary engagement with the side portion 14 of the inner ring 3, see Figs. 3 and 18.

The other driving element or shaft 2 also has a universal connection with the inner gimbal-ring 3, that is effected by means of a yoke 15 on the shaft 2, shown integral therewith, and which engages a float-ball 16, that swings on this yoke, and also on the inner ring 3. This float-ball 16 has equatorial channels 17 and 18, shown at a right angle to each other, see Fig. 12. The yoke 15 turns in one of these channels, and is retained therein by the end piece 19 locked by screws 20, see Fig. 9.

The float-ball is thus encircled at one channel by the yoke with its end piece, while the other channel receives lugs 21 and 22 projecting inwardly in the inner gimbal-ring 3, see Fig. 14. These lugs are diametrically opposite, and have flat parallel sides that swing in the channel 18, and have the end face 23 made concave as shown, see Fig. 15. The float-ball 16 has flattened poles 24, 24 that are spaced apart in the ball a slightly less distance than the nearest portions of the lugs 21 and 22. This will permit the float-ball to be slid into the ring 3 between these lugs until the lugs are opposite these flat portions, whereupon the ball is swung in a plane of the ring, and the concave faces of the lugs will engage the convex face of the channel beyond the flat portions, that will prevent the ball from moving out of the ring. It will thus be seen that the ball will swing in the ring 3 in a certain plane corresponding with one channel of the ball, and that the inner yoke 15 will swing in the other channel of the ball; which will give a universal movement of the inner ring 3 relative to the shaft 2.

This movement is provided with limiting means and an annular buffer face or ring 26 is provided on the shaft 2 that may be integral therewith. The buffer face of this ring will serve to engage the side edge 27 of the ring 3; and it has been set forth that the opposite face 14 of the ring will engage the buffer face 13 of the shaft 1.

The mode of assembling the parts is preferably as follows. The float-ball 16 is brought to engage the lugs 21, 22, at one of the channels as 17 so that the flat faces are opposite the lugs and then the ball is turned through a quarter turn, that will secure the ball in the ring against removal. The inner yoke 15 is next brought to engage the channel 18 by inserting the yoke in the ring 3, and the end piece 19 is inserted and secured by the screws 20. The inner ring 3 now has its outer lugs 11 engaged by the split ring 5 at the journal portions, while at the same time the other two journaled portions of the split ring are secured together by the bolts 9. The device can be taken apart in the reverse order mentioned. It will be observed that the axis of the inner lugs 21, 22, of the inner ring is inclined to the axis of the outer lugs on this ring at an angle of 45 degrees. This axis of the inner lugs is intermediate the two axes of the bearings of the outer gimbal-ring.

In the use of the universal joint, when the shaft 2 is first swung to an angle of about 20 to 30 degrees according to construction, the buffer ring 26 will engage the side edge 27 of the inner ring 3, see Fig. 17. Continued swing of the two driving elements will cause the ring 3 to turn relative to the shaft 1 until the side face 14 of the inner ring will engage the buffer ring 13, as shown in Fig. 18. This is the limit of movement of the universal joint, and if the shafts are revolved at such position, the ring 3 will rotate and have a rolling engagement with the buffer rings 13 and 26. It will be understood that if the driving element 1 is first swung without movement of the other shaft 2, the ring 3 will first engage the buffer ring 13 and then the parts on continued swing will move to the position of Fig. 18. It will thus be seen that the two shafts can be brought to a relative angle that is twice the limit of angular movement of each shaft relative to the inner ring 3. By this means the strain on the several parts is distributed throughout each element of the double universal joint.

What I claim is:

1. In a universal joint, a pair of driving elements, members engaging the driving elements to form a driving connection arranged to cause a universal movement of one driving element by the other, an annular surface bearing portion fast on one driving element, and an annular bearing surface portion on another member of the joint arranged to have a rotary engagement with said annular bearing portion on rotation of the driving elements in relative angular positions whereby to limit the angular relation of the driving elements.

2. In the universal joint, a pair of driving elements, members engaging the driving elements to form a driving connection arranged to cause a universal movement of one driving element by the other, said driving connection including a ring member, and an annual member on each of the driving elements and arranged with an annular bearing surface to each have a rotary engagement with the said ring member whereby to limit the angular relations of the driving elements with the ring member and also with each other.

3. In a universal joint, an annular member, a pair of driving elements, a universal joint connection between the annular member and one driving element, a universal connection between the other driving element and the annular member, each driving element having an annular face arranged to have a rotary engagement with said annular member whereby to limit the angular relations of such driving elements with the annular member and also with each other.

4. In a universal joint, a member having a pair of opposed spaced lugs, a float-ball having an equatorial annular channel at which portion it engages the lugs to turn on an axis perpendicular to the channel, the float-ball having another equatorial channel at an angle to said channel, a member having opposed spaced portions engaging opposed portions of the second slot whereby the latter member can swing relative to the ball in the plane of such channel, the ball at one of said channels having opposed reduced portions located beyond the normal engaging portion of the channel to permit assembly and removal of the said lug member engaging such channel upon shifting the member to an abnormal position, and a yoke for locking said other member in its said channel engaging position.

5. In a universal joint, a member having a pair of opposed spaced lugs, a float-ball having an equatorial annular channel at which portion it engages the lugs to turn on an axis perpendicular to the channel, the float-ball having another equatorial channel at a right angle to said channel, a shaft member having opposed spaced portions engaging opposed portions of the second channel whereby the latter member can swing relative to the ball in the plane of such channel, a second shaft, and a universal joint connecting between the second shaft and said member having lugs.

6. In a device of the character described, an inner gimbal-ring, a float-ball mounted to oscillate in the said gimbal-ring, an outer gimbal-ring in which said inner gimbal-ring is mounted to oscillate, the float-ball and inner gimbal-ring having means for locking against separation during normal operation, and a drive shaft yoke mounted to oscillate upon the float-ball, in a plane at a right angle to the oscillation of the float-ball in the inner gimbal-ring.

7. In a device of the character described, an inner gimbal-ring, a float-ball mounted to oscillate in the said gimbal-ring, an outer gimbal-ring in which said inner gimbal-ring is mounted to oscillate, the float-ball having means for locking in the said inner gimbal-ring against separation during normal operation, and a drive shaft yoke mounted to oscillate upon the float-ball, in a plane at a right angle to the oscillation of the float-ball in the securing ring, and a shaft yoke mounted to oscillate on the outer gimbal-ring.

8. In a device of the character described, a shaft, a main yoke secured to the shaft, an outer gimbal ring pivotally supported in the yoke, an inner gimbal ring pivotally supported in the outer gimbal ring at a secondary angle of oscillation, a float-ball mounted to oscillate in the said inner gimbal-ring, the float-ball having a peripheral yoke channel formed at a right angle to the path of oscillation of the float-ball in the inner gimbal-ring, a second shaft,—and a yoke on the second shaft mounted to oscillate in the said channel of the float-ball when moved in one plane, and to oscillate such float-ball at an angle to such plane when oscillated at another angle.

9. In a device of the character described, a shaft, a main yoke secured to the shaft, an outer gimbal ring pivotally supported in the yoke, an inner gimbal ring pivotally supported in the outer gimbal ring at a secondary angle of oscillation, a float-ball mounted to oscillate in the said inner gimbal ring, the periphery of the float-ball having a peripheral yoke channel formed at a right angle to the path of oscillation of the float-ball in the inner gimbal ring, a second shaft,—and a yoke on the second shaft mounted to oscillate in the said channel of the float-ball when moved in one plane, and to oscillate such float-ball at an angle to such plane when oscillated at an angle of 90 degrees.

10. In a device of the class described, a shaft, a main yoke secured to the shaft, an outer gimbal ring pivotally supported in the yoke, an inner gimbal ring pivotally supported in the outer gimbal ring at a secondary angle of oscillation, a pair of concave faced float-ball securing studs on the outer gimbal ring, a double channeled float-ball mounted to oscillate in the inner gimbal ring and provided with two reduced faces at the intersection of the channels whereby the float ball can be slipped past the said studs with the studs in the one of the channels and be retained in position by swinging thereon, the float ball having one said channel formed at a right angle to the path of oscillation of the float ball in the inner gimbal ring, a second shaft, and a yoke formed on the second shaft arranged to oscillate in the other said channel in the said float ball when swung in one plane and to oscillate such float ball at a right angle to such plane when oscillated in another plane.

11. In a universal joint, a ring member having a pair of opposed spaced lugs with concave end faces, a float-ball having an equatorial annular channel at which portion it engages the lugs to turn on an axis perpendicular to the channel, the float-ball having another equatorial channel at an angle to said channel, and a member having opposed spaced portions engaging opposed portions of the second channel whereby the latter member can swing relative to the ball in the plane of such channel, the ball at one of said channels having opposed reduced portions located beyond the normal engaging portion of the channel to permit assembly and removal of the member engaging such channel upon shifting the member to an abnormal position.

12. In a device of the class described, a gimbal ring, a float-ball mounted to oscillate in the gimbal ring, the float-ball having a channel in the periphery in a plane at a right angle to the path of oscillation of the float-ball in the gimbal ring, a shaft, a yoke on said shaft mounted to oscillate in said float-ball channel when moved in one plane, and to oscillate the float-ball in a plane at a right angle to said plane when oscillated at another angle, said yoke having an annular buffer face arranged to engage said gimbal ring.

13. In a device of the class described, a gimbal ring, and a yoke forming a main support and in which the gimbal ring is mounted to oscillate, said yoke and ring each having annular buffer surface areas arranged to have engagement with the gimbal ring when the ring is oscillated to its limit.

14. In a device of the character described, a main yoke, an outer gimbal ring pivoted in the yoke, an inner gimbal ring pivoted in the said gimbal ring, a shaft oscillatingly mounted for universal movement in the inner gimbal ring, the main yoke having an annular buffer face arranged for engagement with the said inner gimbal ring when such ring is oscillated to limit its angular movement.

15. In a device of the class described, a pair of driving elements, a yoke carried by one driving element, an outer gimbal ring pivoted to said yoke, an inner gimbal ring pivoted to the outer gimbal ring to swing on an axis at an angle of 90 degrees to the axis of the outer gimbal ring on the said yoke, the said yoke having an annular buffer face arranged to have a rolling contact with the inner gimbal ring, the other driving element having an annular buffer face arranged to have a rolling contact with the opposite face of the inner gimbal ring.

16. In a universal joint, the combination of a driving element, a yoke on the driving element having a lug on the outer face of each end, a gimbal-ring comprising split portions with means for securing together, said ring portion having registering cavities at opposite portions to form bearings for said lugs on the yoke, said gimbal-ring having another pair of opposed registering cavities forming bearings, an inner gimbal-ring, and a driving element having a universal movement connection with said inner gimbal-ring.

17. In a universal joint, the combination of a driving element, a yoke on the driving element having a lug on the outer face of each end, a gimbal-ring comprising split portions with means for securing together, said ring portion having registering cavities at opposite portions to form bearings for said lugs on the yoke, said gimbal-ring having another pair of opposed registering cavities forming bearings, an inner gimbal-ring provided with lugs journaled in the said latter bearing portions of the split ring, a float-ball mounted to swing in the said inner ring, and a driving element mounted to swing on said float-ball.

Signed at New York, N. Y., September 10th, 1918.

BERNARD A. ALPERIN.

Copies of this patent may be obtained for five cents each, by addressing the "Commissioner of Patents, Washington, D. C."